(12) United States Patent
Falsi

(10) Patent No.: US 9,471,479 B2
(45) Date of Patent: Oct. 18, 2016

(54) METHOD AND SYSTEM FOR SIMULATING JOB ENTRY SUBSYSTEM (JES) OPERATION

(75) Inventor: Paolo Falsi, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1829 days.

(21) Appl. No.: 11/538,538

(22) Filed: Oct. 4, 2006

(65) Prior Publication Data

US 2007/0100469 A1 May 3, 2007

(30) Foreign Application Priority Data

Oct. 5, 2005 (EP) ..................................... 05109227

(51) Int. Cl.
*G06F 11/36* (2006.01)

(52) U.S. Cl.
CPC ................................. *G06F 11/3696* (2013.01)

(58) Field of Classification Search
USPC ............................................ 707/100; 700/11
See application file for complete search history.

(56) References Cited

U.S. PATENT DOCUMENTS

| 5,021,949 A * | 6/1991 | Morten ................... H04L 12/56 370/389 |
| 6,131,190 A * | 10/2000 | Sidwell ................. G06F 9/5016 717/115 |
| 6,195,765 B1 * | 2/2001 | Kislanko et al. ................ 714/38 |
| 6,223,313 B1 * | 4/2001 | How et al. ...................... 714/724 |
| 2002/0026631 A1 * | 2/2002 | Barritz ........................... 717/127 |
| 2002/0116506 A1 * | 8/2002 | Lautner ................. G06F 9/5011 709/229 |
| 2005/0076043 A1 * | 4/2005 | Benedetti et al. ............ 707/100 |

* cited by examiner

*Primary Examiner* — Ming Hon
(74) *Attorney, Agent, or Firm* — Garg Law Firm, PLLC; Rakesh Garg; Scott S. Dobson

(57) ABSTRACT

A method for simulating a behavior of a spooler (220), comprising: receiving (305) an output file (405) produced by the spooler as a result of the execution of a unit of work in a data processing apparatus, the unit of work being submitted to the spooler by a data processing automation program running on the data processing apparatus; extracting (310, 315) from the received output file at least one collection of data (260, 265, 270), wherein the at least one collection of data includes data necessary to the data processing automation product (205) for performing a data processing automation function; causing (330-350) the data processing automation product receive said at least one collection of data instead of retrieving the necessary data from the spooler.

18 Claims, 3 Drawing Sheets

METHOD AND SYSTEM FOR SIMULATING JOB ENTRY SUBSYSTEM (JES) OPERATION

TECHNICAL FIELD

The present invention generally relates to the field of data processing; more particularly, the invention broadly relates to the automation of functions in data processing systems, such as to methods and systems for the scheduling of work units. Specifically, the invention concerns a method and system for simulating the operation of a Job Entry Subsystem (JES) of an operating system of a data processing apparatus.

BACKGROUND ART

In the field of data processing, data processing automation products are known, specifically designed for automating the execution of tasks.

An example of a data processing automation product are the work scheduling products (shortly, "schedulers"), commonly used in data processing systems for automating the process of submitting and controlling the execution of large quantities of work units, like jobs in a batch processing. Generally speaking, the schedulers submit the jobs to be executed according to a predefined execution plan, which establishes a flow of execution of the jobs according to several factors, such as for example temporal constraints (e.g., date, time, day of the week) and dependencies (such as completion of preceding jobs). An example of scheduler is the "Tivoli Workload Scheduler"—"TWS"—by IBM Corporation.

Most often, automation products like the schedulers rely for their operation on a Job Entry Subsystem (JES), which, as known to those skilled in the art, is a batch processing subsystem of some operating systems (for example, MVS, OS/390 and z/OS by IBM Corporation) responsible of managing the activities that the operating system has to perform for executing the jobs submitted thereto. Essentially, the JES is a spooler, receiving the jobs to be executed, and putting them in a queue for later processing.

The data processing automation product, for example the scheduler, particularly the TWS, invokes the JES and passes thereto the specific jobs (described in the Job Control Language—JCL) for their execution; the JES manages the jobs execution, and returns the jobs execution results to the data processing automation product. The data processing automation product exploits the jobs execution results provided by the JES for the subsequent operations.

SUMMARY OF THE INVENTION

The Applicant has observed that in case the data processing automation product, for example the TWS, encounters problems in its operation, it is usually a hard task to investigate the nature of the problem. In fact, it should be ascertained whether the problem is due to the job execution results returned by the JES. Also, it might be necessary to reproduce the same situation as the one that caused the problems in a debugging, test environment, not to keep busy the data processing system of, for example, a production data processing environment of a customer. In other words, it may be necessary to rerun the data processing automation product in the test environment, and try to reproduce exactly the same situation that existed in the customer data processing environment when the problems were encountered, in the attempt of reproducing the same error(s) that was produced by the JES in the customer environment.

Reproducing exactly the same situation in a different data processing environment is in general very difficult, not to say impossible, because it would imply a perfect knowledge of the customer data processing system configuration and status. Thus, in the practice, it may be necessary to repeatedly rerun the automation product, until the problem is reproduced.

The Applicant is of the opinion that this methodology is not particularly efficient, being time consuming and costly, and it does not guarantee that a solution is found, because it is not possible to guarantee that the same situation that caused the problems may be reproduced on the debugging environment.

Thus, the Applicant has tackled the problem of how to improve the debugging activities that for example are needed to investigate a malfunctioning of a data processing automation product.

According to an aspect of the present invention, a method as set forth in appended claim 1 is provided, for simulating a behavior of a spooler, comprising:

receiving an output file produced by the spooler as a result of the execution of a unit of work in a data processing apparatus, said unit of work being submitted to the spooler by a data processing automation program running on the data processing apparatus;

extracting from the received output file at least one collection of data, wherein said at least one collection of data includes data necessary to the data processing automation program for performing a data processing automation function;

causing the data processing automation program receive said at least one collection of data instead of retrieving the necessary data from the spooler.

Other aspects of the invention concern a system comprising means adapted to carry out the steps of the above method, and a computer program comprising instructions for carrying out the steps of the method when said computer program is executed on a computer.

BRIEF DESCRIPTION OF THE DRAWINGS

The features and advantages of the present invention will be made apparent by the following detailed description of an embodiment thereof, provided merely by way of a non-limitative example, description that will be conducted making reference to the attached drawings, wherein:

FIG. 4 schematically shows a JES output file ("joblog"), and three datasets extracted therefrom for simulating the JES operation, according to an embodiment of the invention.

DETAILED DESCRIPTION OF THE PREFERRED EMBODIMENT(S)

Figure 1:
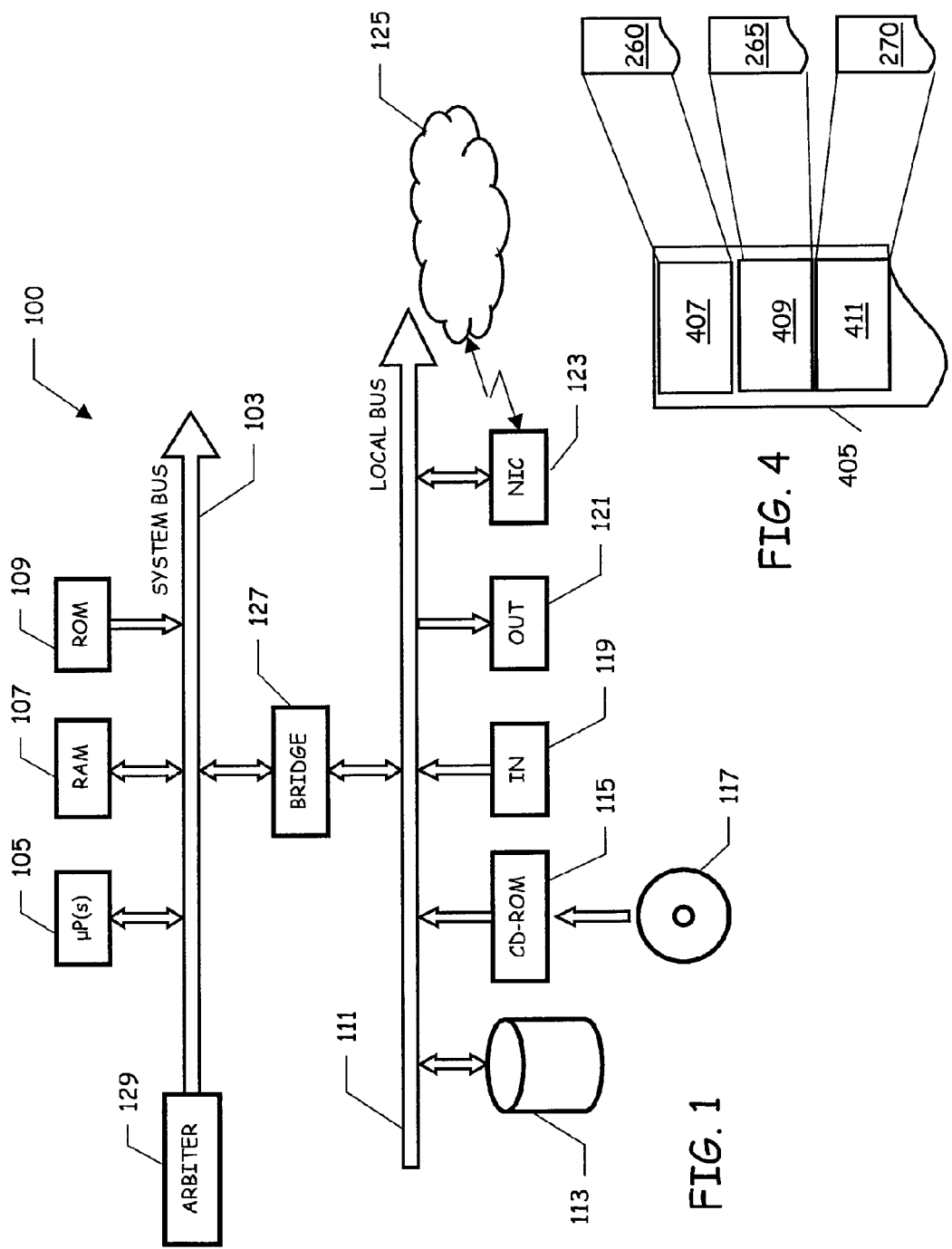
FIG. 1 shows the main (essentially hardware) units of a data processing apparatus adapted to implement a method according to an embodiment of the present invention.

As shown in FIG. 1, the structure of a data processing apparatus 100, particularly albeit non limitatively a mainframe, is shown quite schematically. The data processing apparatus comprises several units that are connected in parallel to a system bus 103; in particular, one or more microprocessors (μP), denoted as a whole 105, control the operation of the data processing apparatus 100; a Random Access Memory (RAM) 107 is directly used as a working memory by the microprocessors 105, and a Read Only Memory (ROM) 109 stores the basic code for a bootstrap of the data processing apparatus 100. Peripheral units are connected (by means of respective interfaces) to a local bus 111. Particularly, mass storage devices comprise one or more hard disk drive 113, one or more CD-ROM/DVD-ROM drive 115 for reading CD-ROMs/DVD-ROMs 117, one or more Direct Access Storage Devices (DASDs), one or more tape units. Moreover, the data processing apparatus 100 typically includes input devices 119, for example a keyboard and a mouse, and output devices 121, such as a display device (monitor), one or more printers. A Network Interface Card (NIC) 123 is used to connect the data processing apparatus 100 to a data communications network 125, like for example a Local Area Network (LAN) or a Wide Area Network (WAN). A bridge unit 127 interfaces the system bus 103 with the local bus 111. Each microprocessor 105 and the bridge unit 127 can operate as master agents requesting an access to the system bus 103 for transmitting information; an arbiter 129 manages the granting of the access to the system bus 103.

Figure 2:
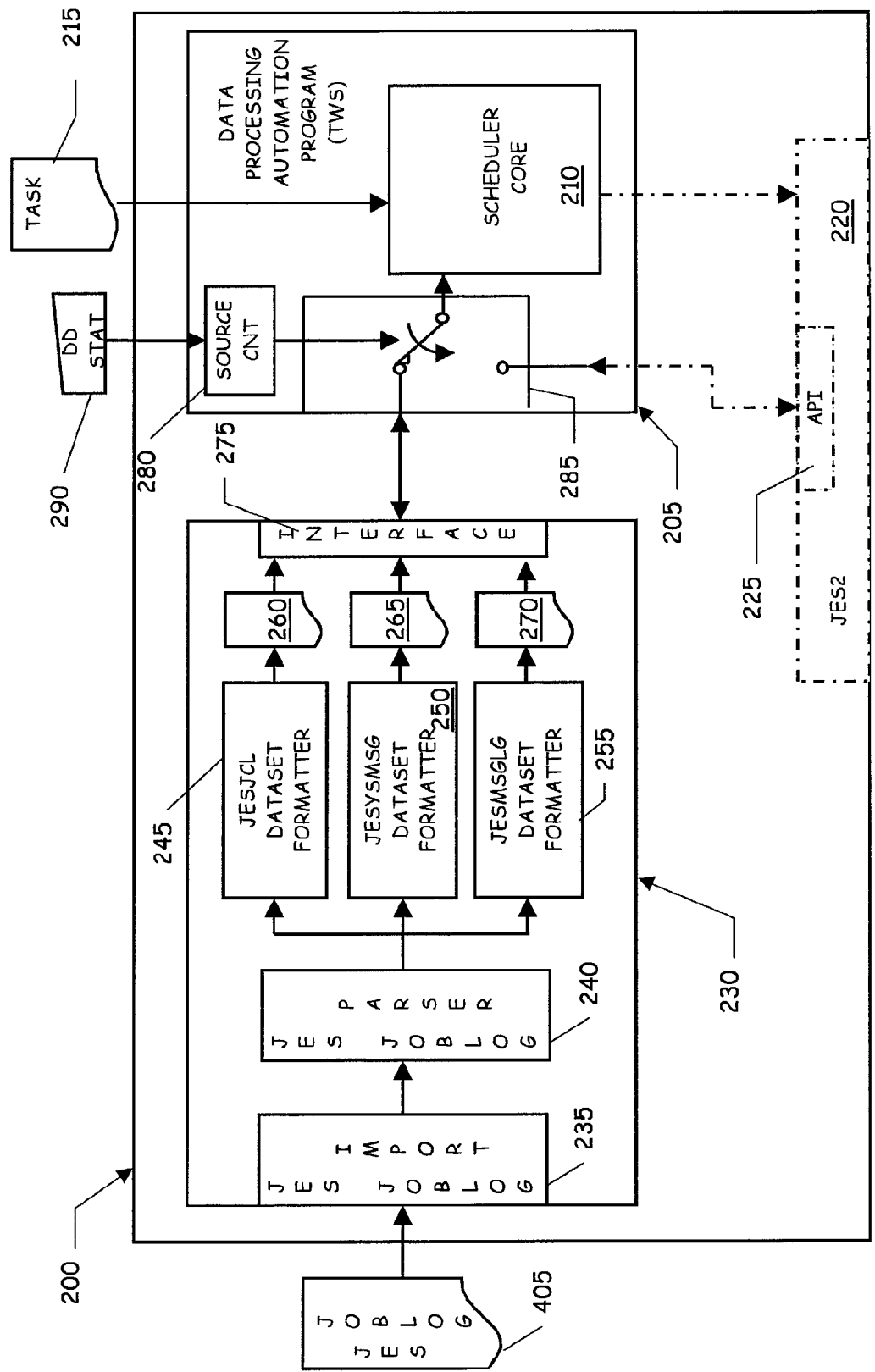
FIG. 2 schematically depicts, in terms of functional blocks, the content of a working memory of the data processing apparatus of FIG. 1 when executing a computer program adapted to implement a method according to an embodiment of the invention.

Referring now to FIG. 2, the components, particularly software components, implementing a method according to an embodiment of the invention are schematically shown. Particularly, in FIG. 2 reference numeral 200 is used to denote a portion of the working memory 105 of the data processing apparatus 100 while implementing the method. The information (programs and data) is typically stored on the data processing apparatus hard disk 113, and loaded (at least partially) into the working memory 105 when the programs are launched and running. The programs may be initially installed onto the hard disk from, e.g., CD-ROMs or DVD-ROMs or DASD, or they may be downloaded from, e.g., a distribution server machine (not shown in the drawings), for example through the data communications network 125. In FIG. 2, an operating system is not shown explicitly, but it is to be intended as running in background in the data processing apparatus 100; for example, in the case the data processing apparatus 100 is a mainframe, the operating system may be the MVS, the OS/390 or the z/OS, all by IBM Corporation.

In the drawing, reference numeral 205 denotes a data processing automation program, for example a scheduler, particularly albeit not limitatively the already mentioned TWS by IBM Corporation. The scheduler 205, whose specific internal structure is not relevant to the understanding of the invention embodiment being described, is depicted as including a scheduler core module 210, adapted to manage the automated execution of jobs, as specified in properly formatted task descriptions, like the task description 215 schematically shown in the drawing, which is assumed to be provided as input to the scheduler core module 210.

Without entering into excessive details, known to those skilled in the art and not relevant for the understanding of the invention embodiment herein presented, the scheduler 205, particularly the scheduler core module 210, is a software component used to automate the submission of desired jobs in the data processing apparatus 100. The jobs to be executed by the scheduler 205 are defined in a scheduler workload database that includes, for each job submitted to be scheduled for execution, a respective descriptor, written in a suitable control language, for example, in JCL (Job Control Language) or in a control language based on XML (extensible Markup Language); a job descriptor is a collection of several pieces of information, containing a description of the program to be executed for the execution of that job, the parameter(s) to be passed to the program to be executed, the resource required for the execution of the program, the scheduling policies.

The scheduler includes a controller, which transmits information about the jobs to be executed to an execution plan builder. The execution plan builder creates one or more execution plans for controlling a flow of execution of batches of jobs in a desired sequence (for example, covering a period of 24 hours). Each execution plan is built according to the information contained in the job descriptors, extracted from the workload database; for example, the execution plans are built based on the temporal constraints and the dependencies of the jobs, as defined in their descriptors. The execution plan builder stores the definition of the execution plans thus obtained into a corresponding repository. The controller requests the execution of a selected execution plan to an executor, which extracts the definition of the current execution plan from the repository. The executor submits each job for execution.

Conventionally, the scheduler core module 210 manages the automated execution of the jobs specified in the tasks by interacting with a spooler, which is a subsystem of the data processing apparatus operating system responsible of managing the execution of jobs; a well known example of spooler is the JES, particularly albeit not limitatively the version JES2 (everything applies as well to the other version of the JES, denoted JES3). In the drawing, the spooler, assumed for example to be the JES2, is depicted only schematically, by way of a dashed-and-dotted block 220. In particular, in normal operation, the scheduler 205 submits the jobs to be executed to the JES2 220.

As known to those skilled in the art, when a job is submitted thereto for execution, the JES2, in addition to notifying the data processing automation scheduler 205 of the successful/unsuccessful outcome of the job execution, produces an output file, hereinafter shortly referred to as the "joblog". As depicted schematically in FIG. 4, the joblog, denoted as a whole by reference numeral 405, includes, possibly among other data which are however not relevant to the present description, three collections of data, represented as three sections 407, 409 and 411 of the joblog 405.

A first joblog section 407, also referred to as the "joblog base" or, in acronym, "JESJCL", includes a description of the job that has been submitted to the JES2 for execution, for example by a scheduler like the scheduler 205; the job description is typically in the JCL.

A second joblog section 409, also referred to as the "JES system messages" or, in acronym, "JESYSMSG", includes a chronological list of JES2-specific system messages, which are issued by the JES and are inherent to the operation thereof.

A third joblog section 411, also referred to as the "JES message log" or, in acronym, "JESMSGLG", includes a chronological list of job-specific messages that are specific to the job that the JES2 has executed.

In normal operation, the data processing automation program 205, like for example the TWS, after having submitted the job to the spooler, e.g. the JES2, for the execution of the job, receives from the spooler a notification of the successful/unsuccessful outcome of the job execution. In the case the data processing automation product ascertains that the job execution produced an error, the data processing automation product may retrieve the information necessary to continue its operation, for example for resubmitting the job to the spooler, by inquiring the spooler. In particular, the JES2 has an Application Program Interface (API), schematically shown in the drawing and identified by 225, which is exploited by the data processing automation program 205 for retrieving the necessary information, for example in order to resubmit the job for execution, and/or to investigate why the job execution terminated erroneously. In particular, albeit not limitatively, the data processing automation program 205 may need to retrieve information concerning the job description, information concerning the system messages that the JES2 issued during the job execution, and job-specific messages, related to the execution of the job. The data processing automation product 205 may get the necessary information by inquiring the JES2 through the API 225. For example, in the case of the TWS, if the TWS ascertains that the execution of a generic submitted job terminated erroneously, the TWS may be caused to perform a job restart and cleanup, whereby the status of the data processing system is brought back to the original status before the job was submitted to the JES, and the job is restarted, i.e., submitted again to the JES for execution; for both these operations, the TWS exploits the information included in the joblog and retrieved from the JES.

According to an embodiment of the present invention, a simulation software program is provided for, which, when executed in a data processing apparatus, like the data processing apparatus 100 of FIG. 1, is adapted to simulate the behavior of the spooler, particularly the JES, when executing a generic job, by exploiting a joblog produced by the JES, particularly the joblog produced by the JES during a real execution of the job.

In particular, the simulation software, also referred to as simulator and denoted as a whole 230 in the drawing, includes a JES joblog import module 235, a JES joblog parser module 240, and three datasets formatter modules, namely a JESJCL dataset formatter module 245, a JESYSMSG dataset formatter module 250, and a JESMSGLG dataset formatter module 255. The three datasets formatter modules 245, 250 and 255 produce each a respective dataset 260, 265, 270, extracting specific data from an imported joblog. An interface module 275, for example but not limitatively an API like the API 225 of the JES2, allows the data processing automation program 205 to inquire the simulation software and retrieve the necessary information essentially in the same way it would do in a normal operation, inquiring the JES.

In an embodiment of the present invention, the data processing automation program 205 includes an information source controller module 280, adapted to control an information source selector module 285. The information source selector module 285 allows selecting the source of information, i.e. whether the information needed by the data processing automation program core 210 for performing its function (e.g., in case of a restart and cleanup, for resubmitting the job) are to be retrieved from the JES2 (through the JES API) or from the simulation software program 230.

In an alternative embodiment of the present invention, the simulation software program 230 may further include an interceptor module (not shown in the drawing) adapted to intercept an inquiry issued by the data processing automation product 205 and directed to the JES, and for diverting the intercepted request to the interface module 275. In this case, the selection of the information source is not performed by the data processing automation program, for which the fact that the information are provided by the JES or by the simulator is totally transparent.

Figure 3:
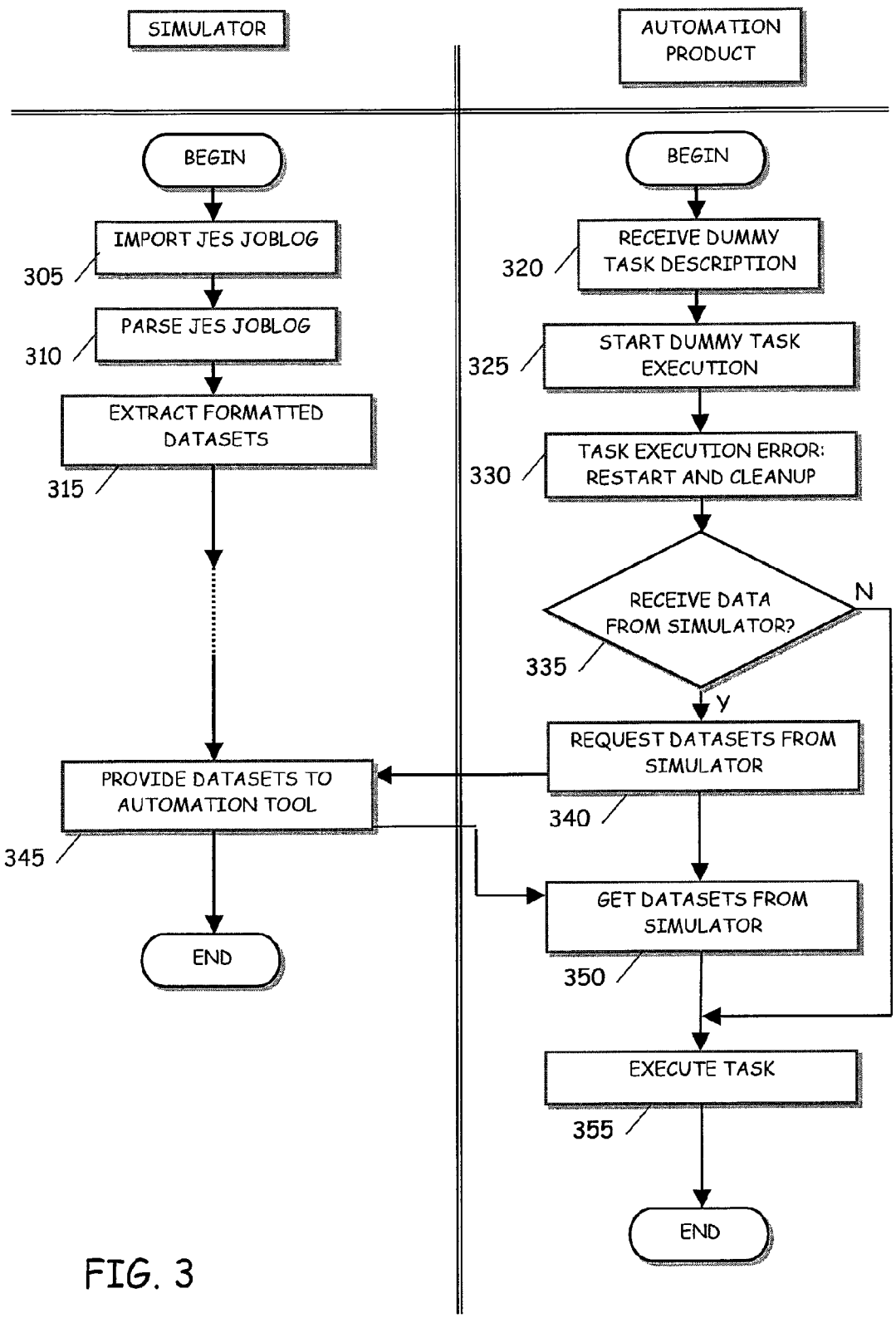
FIG. 3 is a schematic flowchart describing the activities involved in the implementation of a method according to an embodiment of the invention.

A method according to an embodiment of the present invention will be now described in detail, making reference to the schematic flowchart of FIG. 3. In particular, the method described allows reproducing, e.g. in a laboratory or test environment, a malfunctioning, like an error, occurred during the operation of the data processing automation program in a different data processing environment, like for example the production data processing environment of a customer.

In the following description of the method, it is in particular assumed that the data processing apparatus 100 wherein the data processing automation program 205 and the simulator 230 are being executed is the test or laboratory environment.

Preliminary, the joblog produced by the JES when the data processing automation product, running in a data processing apparatus of the customer data processing environment, submitted the job to the JES for execution is obtained, for example in the form of a file that can be saved on a portable storage support, or transferred over a data communications network to the test data processing apparatus 100; the joblog file, depicted schematically in FIGS. 2 and 4 and identified therein by reference numeral 405, forms an input to the simulator 230.

After having started the simulator 230 in the test data processing apparatus 100, the (JES joblog import module 235 of the) simulator 230 imports joblog file 405 (block 305).

Then, the imported joblog file 405 is parsed (by the JES joblog parser module 240) (block 310), and the three datasets 260, 265 and 270 are prepared (by the three datasets formatter modules 245, 250 and 255), respectively, by extracting predetermined collections of data from the (sections 407, 409 and 411 of the) JES joblog file 405 (block 315). In particular, in an embodiment of the present invention, the three datasets include a first, JESJCL dataset 260, including the description of the executed job, in JCL language (this dataset corresponds to the data in the JESJCL section 407 of the joblog 405), a second, JESSYSMSG dataset 265, including a list of system messages issued by and specific to the operation of the JES during the execution of the job, and a third (this dataset corresponds to the JESYSMSG section 409 of the joblog 405), JESMSGLG dataset 270, including a list of system messages specific to the operations performed by the job during its execution (this dataset corresponds to the JESMSGLG section 411 of the joblog 405). In particular, the three datasets 265, 270 and 275 include those data that, in the normal operation, the data processing automation program would retrieve from the JES joblog, by inquiring the JES through the API. It is however pointed out that the number and the specific content of the datasets are not limitative to the present invention, and may greatly vary depending on the specific type of data processing automation program, being however collection(s) of data that are available in, and extracted from the JES joblog, and that the data processing automation program would, in its normal operation, retrieve from the joblog by inquiring the JES through the API.

In parallel, or at a different time, the data processing automation program 205 is started on the test environment; when the data processing automation program is materially started on the test environment is not limitative to the present invention: it may be started before, in parallel or after the start of the simulator 230.

In particular, in an exemplary embodiment of the present invention, when the data processing automation program 205 is started, a statement is provided thereto, particularly albeit not limitatively a DD statement in the case of the TWS; this statement is recognizable by the information source controller module 280, which instructs the information source selector module 285 to switch onto the simulator 230.

The data processing automation program 205 is provided with a description 215 of a task to be executed (block 320). In particular, in an embodiment of the present invention, the task description 215 may be a dummy task description, including a task name equal to the name of the task that produced the malfunctioning in the customer data processing apparatus, and adapted to deliberately cause an error when the data processing automation program 205 running on the test data processing apparatus 100 tries to execute it. The execution of the dummy task is then started (block 325. The execution of the task deliberately cause an error, and the scheduler 205 is caused (either by an operator, or automatically, having been specified at the launch of the scheduler) to perform a restart and cleanup (block 330).

If, upon launching of the data processing automation product, it had been specified (for example through the DD statement) that information source is the simulator 230, not the JES 220 (decision block 335, exit branch Y), the data processing automation program issues to the simulator 230 one or more requests for getting the three datasets (block 340).

The simulator 230 receives the request(s) from the data processing automation program 205, and provides the three datasets 260, 265 and 270 thereto (block 345).

Thus, the data processing automation program 205 receives the three datasets 260, 265 and 270 from the simulator 230, instead of requesting it from the JES (block 350), and then continues the execution of the task using as data the data contained in the three datasets 260, 265 and 270 and extracted from the JES joblog 405 produced by the JES in the customer data processing environment (block 335). For example, in the case of the TWS, the restart and cleanup activities are performed based on the information included in the three datasets 260, 265 and 270.

In this way, the operation of the spooler in the customer data processing environment may be reproduced in a test data processing environment by simply simulating the behavior of the JES, and it is easier to investigate the nature of the problems that caused the malfunctioning of the data processing automation product in the customer data processing environment: it is sufficient to get the output file produced by the spooler in the customer data processing environment in respect of the job whose execution caused the malfunctioning.

As already pointed out, the number and the specific content of the datasets that have to be generated starting from the spooler joblog are not limitative to the present invention, and may vary depending on the specific type of automation product. In the practice, directives about how to build the datasets to be passed to the data processing automation product may be deduced by an analysis of the data returned from the spooler to a specific data processing automation product under request of the latter (using the API of the JES).

Also, even though in the previous description reference has been made to the restart and cleanup functionality of the TWS, this is not to be intended as a limitation of the present invention: more generally, the invention provides a method by which, in a test environment, it is possible to provide to a data processing automation program product, for whatsoever functionality thereof, data which the data processing automation program product, running in a production data processing environment, would get from the spooler after having submitted a job for execution.

The implementation of the present invention has been described making reference to an exemplary embodiment thereof, however those skilled in the art will be able to envisage modifications to the described embodiment, as well as to devise different embodiments, without however departing from the scope of the invention as defined in the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of the present description, a computer-usable or computer-readable medium can be any apparatus, device or element that can contain, store, communicate, propagate, or transport the program for use by or in connection with the computer or instruction execution system.

The medium can be an electronic, magnetic, optical, electromagnetic, infrared, or semiconductor storage medium, network or propagation medium. Examples of a storage medium include a semiconductor memory, fixed storage disk, moveable floppy disk, magnetic tape, and an optical disk. Current examples of optical disks include compact disk—read only memory (CD-ROM), compact disk—read/write (CD-R/W) and digital versatile disk (DVD), DASD. Examples of a propagation medium include wires, optical fibers, and wireless transmission.

The invention can be applied in a data processing system having a different architecture or based on equivalent elements; each computer can have another structure or it can be replaced with any data processing entity (such as a PDA, a mobile phone, and the like).

The invention claimed is:

1. A method for simulating a behavior of a spooler, comprising:
  receiving an output file produced by the spooler as a result of the execution of a unit of work in a data processing apparatus, said unit of work being submitted to the spooler by a data processing automation program, the data processing automation program executing using a memory on the data processing apparatus and performing normal operations, wherein executing the data processing automation program using the memory on the data processing apparatus and performing normal operations comprises an operation of the instance of the data processing automation program in a customer environment;
  extracting from the received output file at least one collection of data, wherein said at least one collection of data includes data necessary to the data processing automation program for performing a data processing automation function;
  switching the data processing automation program that is executing using the memory on the data processing apparatus from the operation in the production data processing environment to operate in a test environment while continuing to use the memory in the data processing apparatus, wherein the data processing automation program includes a selector module, the selector module enabling the data processing automation program to select between a data source to perform the normal operations in the customer environment and another data source to operate in the test environment; and causing the data processing automation program operating in the test environment to receive said at least one collection of data instead of retrieving the necessary data from the spooler.

2. The method according to claim 1, wherein the spooler is a Job Entry Subsystem.

3. The method according to claim 2, wherein:
said output file is a joblog of Job Entry Subsystem; and
said at least one collection of data includes at least one among the following collections of data:
a first collection of data including a description of the unit of work that has been submitted to the Job Entry Subsystem for execution in said data processing apparatus;
a second collection of data including a chronological list of system messages issued by the Job Entry Subsystem during the execution of the unit of work in said data processing apparatus; and
a third collection of data including a chronological list of messages generated during the execution of the unit of work in said data processing apparatus and specific to the executed unit of work.

4. The method according to claim 1, wherein said causing the data processing automation program to receive said at least one collection of data instead of retrieving the necessary data from the spooler includes having the data processing automation program request the at least one collection of data instead of interrogating the spooler.

5. The method according to claim 4, wherein said having the data processing automation program request the at least one collection of data includes causing the data processing automation program re-execute the unit of work.

6. The method according to claim 5, wherein said having the data processing automation program request the at least one collection of data instead of interrogating the spooler includes providing a command to the data processing automation program.

7. The method according to claim 6, wherein said command includes a DD statement.

8. The method according to claim 1, wherein the data processing automation program includes a scheduler, particularly a Tivoli Workload Scheduler.

9. The method of claim 1, wherein the data processing automation program performing normal operations and the data processing automation program operating in the test environment are distinct data processing automation programs, the data processing automation program performing normal operations operating in a production data processing environment as distinct from the test environment.

10. A system for simulating a behavior of a spooler, comprising:
a storage device stores computer usable program code; and
a processor, wherein the processor executes the computer usable program code, and wherein the computer usable program code comprises:
computer usable code for receiving an output file produced by the spooler as a result of the execution of a unit of work in a data processing apparatus, said unit of work being submitted to the spooler by a data processing automation program, the data processing automation program executing using a memory on the data processing apparatus and performing normal operations, wherein executing the data processing automation program using the memory on the data processing apparatus and performing normal operations comprises an operation of the instance of the data processing automation program in a customer environment;
computer usable code for extracting from the received output file at least one collection of data, wherein said at least one collection of data includes data necessary to the data processing automation program for performing a data processing automation function;
computer usable code for switching the data processing automation program that is executing using the memory on the data processing apparatus from the operation in the production data processina environment to operate in a test environment while continuing to use the memory in the data processing apparatus, wherein the data processing automation program includes a selector module, the selector module enabling the data processing automation program to select between a data source to perform the normal operations in the customer environment and another data source to operate in the test environment; and
computer usable code for causing the data processing automation program operating in the test environment to receive said at least one collection of data instead of retrieving the necessary data from the spooler.

11. A computer program in a computer readable non-transitory storage medium for simulating a behavior of a spooler comprising:
instructions for receiving an output file produced by the spooler as a result of the execution of a unit of work in a data processing apparatus, said unit of work being submitted to the spooler by a data processing automation program, the data processing automation program executing using a memory on the data processing apparatus and performing normal operations, wherein executing the data processing automation program using the memory on the data processing apparatus and performing normal operations comprises an operation of the instance of the data processing automation program in a customer environment;
instructions for extracting from the received output file at least one collection of data, wherein said at least one collection of data includes data necessary to the data processing automation program for performing a data processing automation function;
instructions for switching the data processing automation program that is executing using the memory on the data processing apparatus from the operation in the production data processing environment to operate in a test environment while continuing to use the memory in the data processing apparatus, wherein the data processing automation program includes a selector module, the selector module enabling the data processing automation program to select between a data source to perform the normal operations in the customer environment and another data source to operate in the test environment; and
instructions for causing the data processing automation program operating in the test environment to receive said at least one collection of data instead of retrieving the necessary data from the spooler.

12. The computer program according to claim 11, wherein the spooler is a Job Entry Subsystem and wherein
said output file is a joblog of Job Entry Subsystem; and
said at least one collection of data includes at least one among the following collections of data:
a first collection of data including a description of the unit of work that has been submitted to the Job Entry Subsystem for execution in said data processing apparatus;
a second collection of data including a chronological list of system messages issued by the Job Entry Subsystem during the execution of the unit of work in said data processing apparatus; and
a third collection of data including a chronological list of messages generated during the execution of the unit of work in said data processing apparatus and specific to the executed unit of work.

13. The computer program according to claim 11, wherein said computer usable code for causing the data processing automation program to receive said at least one collection of data instead of retrieving the necessary data from the spooler includes computer usable code for having the data processing automation program request the at least one collection of data instead of interrogating the spooler.

14. The computer program according to claim 13, wherein said having the data processing automation program request the at least one collection of data includes causing the data processing automation program re-execute the unit of work.

15. The computer program according to claim 14, wherein said having the data processing automation program request the at least one collection of data instead of interrogating the spooler includes providing a command to the data processing automation program.

16. The computer program according to claim 15, wherein said command includes a DD statement.

17. The computer program according to claim 11, wherein the data processing automation program includes a scheduler, particularly a Tivoli Workload Scheduler.

18. The computer program of claim 11, wherein the data processing automation program performing normal operations and the data processing automation program operating in the test environment are distinct data processing automation programs, the data processing automation program performing normal operations operating in a production data processing environment as distinct from the test environment.

* * * * *